United States Patent
Rice

(10) Patent No.: US 9,206,083 B2
(45) Date of Patent: Dec. 8, 2015

(54) SHRINKAGE-COMPENSATING CONCRETE

(71) Applicant: PKL CORPORATION, Los Angeles, CA (US)

(72) Inventor: Edward K. Rice, Los Angeles, CA (US)

(73) Assignee: PKL Corporation, Los Angeles, CA (US)

( * ) Notice: Subject to any disclaimer, the term of this patent is extended or adjusted under 35 U.S.C. 154(b) by 0 days.

(21) Appl. No.: 14/584,968

(22) Filed: Dec. 29, 2014

(65) Prior Publication Data

US 2015/0107493 A1    Apr. 23, 2015

Related U.S. Application Data

(63) Continuation of application No. 13/840,796, filed on Mar. 15, 2013, now abandoned.

(60) Provisional application No. 61/694,175, filed on Aug. 28, 2012.

(51) Int. Cl.
| | |
|---|---|
| C04B 28/04 | (2006.01) |
| C04B 7/02 | (2006.01) |
| C04B 11/30 | (2006.01) |
| C04B 28/06 | (2006.01) |
| C04B 111/62 | (2006.01) |

(52) U.S. Cl.
CPC .............. *C04B 28/04* (2013.01); *C04B 11/30* (2013.01); *C04B 28/065* (2013.01); *C04B 2111/62* (2013.01)

(58) Field of Classification Search
CPC ................................. C04B 7/02; C04B 28/04
USPC ........................................................ 106/713
See application file for complete search history.

(56) References Cited

U.S. PATENT DOCUMENTS

| | | | | |
|---|---|---|---|---|
| 3,884,710 | A * | 5/1975 | Allen et al. | 106/713 |
| 4,039,345 | A * | 8/1977 | Emig et al. | 524/8 |
| 4,419,136 | A * | 12/1983 | Rice | 126/89 |
| 5,489,333 | A * | 2/1996 | Soroushian et al. | 106/697 |
| 5,741,357 | A * | 4/1998 | Sheikh | 106/692 |
| 5,846,316 | A * | 12/1998 | Rice | 106/735 |
| 7,988,782 | B2 * | 8/2011 | Rice et al. | 106/644 |
| 8,303,707 | B2 * | 11/2012 | Rice et al. | 106/644 |
| 8,545,619 | B2 * | 10/2013 | Rice | 106/644 |
| 8,715,409 | B2 * | 5/2014 | Rice et al. | 106/644 |
| 2006/0144299 | A1 * | 7/2006 | Takada et al. | 106/672 |
| 2007/0125273 | A1 * | 6/2007 | Pinto | 106/638 |
| 2014/0060391 | A1 * | 3/2014 | Rice | 106/788 |

FOREIGN PATENT DOCUMENTS

GB    2132619    * 1/1985

* cited by examiner

*Primary Examiner* — Paul Marcantoni
(74) *Attorney, Agent, or Firm* — Kenneth H. Ohriner; Perkins Coie LLP

(57) ABSTRACT

A shrinkage compensating concrete does not require restraint. The expansive forces developed during hydration compensate for concrete shrinkage, obviating the need for any added internal or external restraint element. Using this new shrinkage compensating concrete, substantially crack-free slabs may be built without using restraining steel bars, fibers, or other separate restraining element. The shrinkage compensating concrete includes a cement that develops internal expansive forces that never exceed the tensile strength of the concrete, such that the internal expansion compensates for the concrete shrinkage. The expansive cement may be an ASTMS, M or S cement, or other expansive cements may also be used.

7 Claims, 2 Drawing Sheets

Expansion of self-leveling composition with various amounts of expansive additives.

Figure 1- Expansion of self-leveling composition with various amounts of expansive additives.
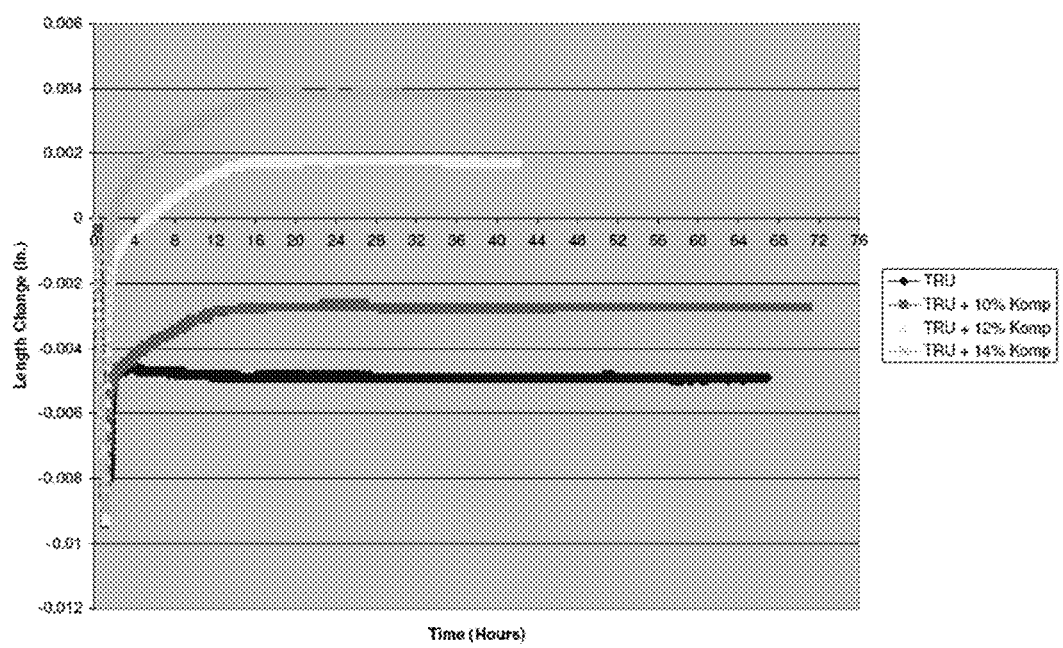

Figure 2- Expansion of cement mortar composition with various amounts of expansive additives.
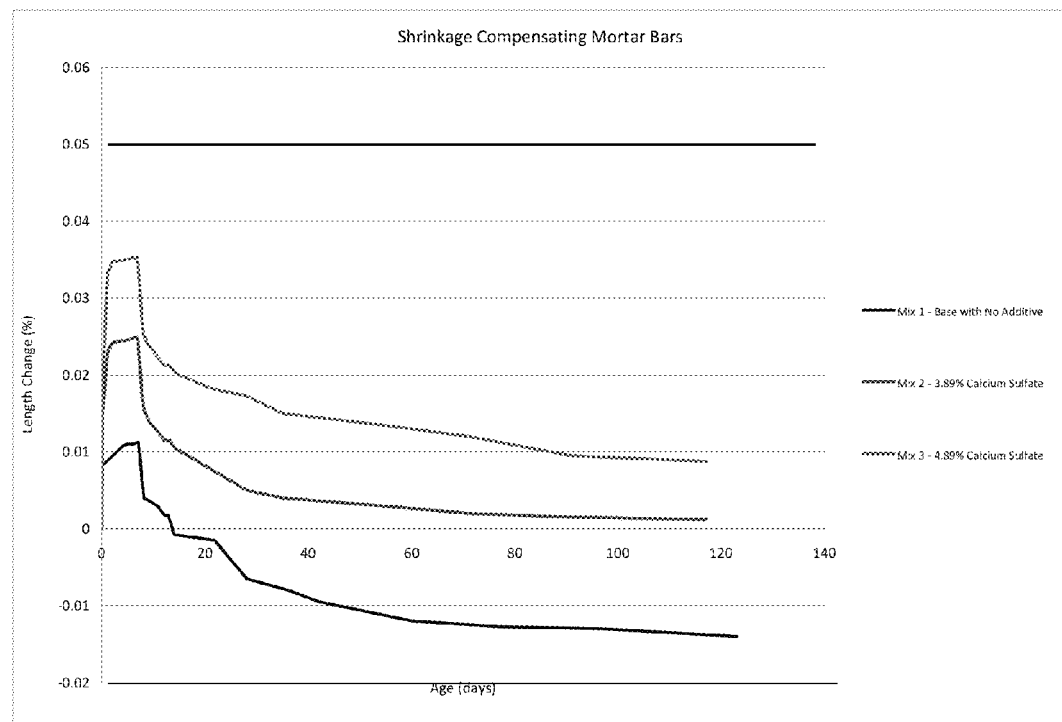

SHRINKAGE-COMPENSATING CONCRETE

PRIORITY CLAIM

This Application is a Continuation of application Ser. No. 13/840,796 filed Mar. 15, 2013 and now pending, which claims priority to U.S. Patent Application No. 61/694,175 filed Aug. 28, 2012, both incorporated herein by reference.

BACKGROUND OF THE INVENTION

The field of the invention is improved shrinkage compensating concrete. As is well known, traditional concrete tends to shrink as it dries or cures. This shrinkage occurs with loss of water as the concrete dries. The drying shrinkage creates tensile stresses in the concrete. Since concrete generally has low tensile strength, shrinkage stresses often cause cracking.

To avoid or reduce cracking caused by shrinkage, various expansive concretes have been used. See for example Klein, U.S. Pat. No. 3,251,701, Rice, U.S. Pat. No. 4,419,136, and Rice U.S. Pat. No. 5,846,316, each incorporated herein by reference. These and other shrinkage-compensating concretes include an expansive component or cement. The expansive cement generally is a hydraulic cement that itself includes an expansive component that expands during hydration. The expansive cement causes the concrete to expand slightly as it dries, which helps to offset or compensate for the shrinkage associated with drying. As a result, shrinkage and resulting tensile stresses in the concrete are reduced or eliminated, along with the cracking resulting from those stresses.

The tensile strength of concrete increases over time, using an expansive cement can also help reduce shrinkage cracking by reducing the tensile stresses, until the concrete acquires sufficient tensile strength to better withstand the tensile stresses without cracking. After the concrete has expanded, subsequent drying shrinkage will reduce the expansive stresses. Ideally though, a residual compression may remain in the concrete indefinitely, thereby eliminating shrinkage cracking.

Shrinkage compensating concrete conventionally requires a restraint element to prevent the concrete from over-expanding, which leads to cracking, crumbling and/or spalling. The restraint element may be external, such as other building structures, or temporary external construction plates or bars, such as described for example in Ytterberg U.S. Patent Application No. 2009/0071086. More often though, the restraint element is provided internally using steel rods, bars, mesh or fibers embedded into the shrinkage compensating concrete.

Since the advent of shrinking compensating concretes, for example beginning with Klein U.S. Pat. No. 3,251,701 as far back as 1961, or earlier, the industry and engineering convention has been that shrinkage compensating concretes must be restrained to achieve desired performance. Indeed, the relevant material standard, ASTM C 845 even defines shrinkage compensating concrete as a concrete that is internally restrained with resilient (e.g., steel) reinforcing and made with expansive cement with induces compressive stress in the concrete that approximately offsets tensile stresses that result from drying shrinkage. The minimum percentage of steel for restraint is 0.15% of the cross-sectional area. This is the restraint used in ASTM 878 Standard Test Method for Restrained Expansion of Shrinkage-Compensating Concrete. Correspondingly, various building codes specify that structures made with shrinkage compensating concrete must have a minimum amount of restraint, typically specified as a minimum amount of steel restraining rods. Thus, for over 50 years all known shrinkage compensating concrete structures have used added restraining elements.

An ideal shrinkage compensating concrete would have sufficient self-restraint to avoid cracking, without use of any steel bars, steel or non-metal fibers, or any other added restraining element. However, no such shrinkage compensating concrete has yet been realized.

SUMMARY OF THE INVENTION

A new shrinkage compensating concrete not requiring restraint has now been invented. In this new shrinkage compensating concrete, the expansive forces developed during hydration compensate for concrete shrinkage, obviating the need for any added internal or external restraint element. Using this new shrinkage compensating concrete, substantially crack-free slabs may be built without using restraining steel bars, fibers, or other separate restraining element.

In one aspect, a shrinkage compensating concrete includes a cement that develops internal expansive forces that never exceed the tensile strength of the concrete, such that the internal expansion compensates for the concrete shrinkage, resulting in a shrinkage-compensating slab or other structure without the need for internal or external reinforcement. The expansive cement may be an ASTMS, M or S cement, or other expansive cements may also be used. Typically the expansive cement may include calcium sulfoaluminate or any other oxide or sulfate that expands upon hydration.

Other and further objects and advantages will become apparent to persons skilled in the art from the following detailed description, which is provided by way of example, and not as limitations on the invention.

BRIEF DESCRIPTION OF THE DRAWING

FIG. 1 is a graph of typical shrinkage as a function of time for a self-leveling hydraulic cement composition, with and without an expansive additive.

FIG. 2 is a graph of expansion of a cement mortar composition with various amounts of expansive additives.

DETAILED DESCRIPTION

Definitions

Expansive cement: a cement that when mixed with water forms a paste that, after setting, tends to increase in volume to significantly greater degree than Portland cement paste. ACI 223-98.

Shrinkage compensating cement: A cement that, when mixed with water, produces a paste that, after setting, increases in volume to a significantly greater degree than does Portland cement paste. ACI 223-98.

Shrinkage compensating concrete: The ASTM standard specification for expansive hydraulic cement (ASTM C 845) defines shrinkage compensating concrete as a concrete that is internally restrained with resilient reinforcing and made with expansive cement with induces both compressive stress in the concrete and positive steel strain that approximately offsets tensile stresses induced by drying shrinkage.

Several methods may be used to measure the expansive properties of concrete (See Rice, U.S. Pat. No. 3,779,085). The restrained expansion of mortar is generally measured using ASTM C 806: "Test Method for Restrained Expansion of Expansive Cement Mortar". The compressive strength of the expansive cement is measured using ASTM Test Method C 109/C109M, except that a water-cement ratio of 0.50 shall be used, the specimens shall be covered with a polyethylene sheet or other suitable material for preventing loss or gain of moisture at the surface of the specimens during the moist storage period in the molds, and the specimens shall remain in the molds for 3 days.

The scope of ASTM C 806 covers the determination of length changes of expansive mortar, while under restraint, due to the development of internal forces resulting from hydration of the cement. The apparatus used is as follows:

Molds: The molds for casting test specimens, when used in conjunction with the restraining cage described below, shall provide for forming either 2 by 2 by 10 in. prisms having a 10-in. gage length, or 50 by 50 by 250 mm prisms having a 250 mm gage length. The molds shall otherwise conform to the requirements of Practice C 490, except that the cage stud holder, gage stud and spacer screws described in that specification shall not be used.

Restraining cage: The cage consists of a threaded steel rod with steel end plates held in place by nuts. The rod shall be provided with cap nuts for the prevention of corrosion. The rod shall conform to specification A 307 grade A steel.

The method for measuring the restrained expansion in concrete is ASTM C 878 "Restrained Expansion of Shrinkage Compensating Concrete". The scope of ASTM C 878 covers the determination of the expansion of concrete made with shrinkage compensating cement. Its significance and use are as follows:

Since the potential for expansion, under conditions of controlled restraint, of concrete made with shrinkage compensating cement cannot always be satisfactorily predicted from tests of mortars made in accordance with Test Method C 806, a need has been recognized for a test method in which concrete specimens are tested. This test method can also be adapted readily to studies of expansion involving degrees of restraint, comparison of cements, effects of cement contents, aggregates, mixture proportions, schedules or environmental treatments that differ from the standards procedures prescribed by this test method. The test restrains expansion using internal steel.

External restraint: A restraint element external of the concrete conventionally used to restrain shrinkage compensating concrete. External restraint typically may be a surrounding structure, such as a previously existing concrete slab or a wall, that prevents a newly poured shrinkage compensating concrete from expanding. Pouring forms, such as plates, pipes, plywood, etc. used to simply confine the concrete are not external restraint. These types of forms confine, but do not restrain, the concrete.

Internal restraint: A restraint element within the concrete used to restrain the expansion of the concrete. Typically these are steel bars or rods, or steel or polymer fibers.

Substantial restraint in a slab. Substantial restraint for the purposes of this invention is defined in ACI 223R-10, section 5.2.2 as a ratio of steel reinforcement area to gross concrete area of 0.15%. Consequently, a slab built with a ratio of 0.015% or less shall be considered as lacking substantial restraint.

DISCUSSION

The inventors have discovered that shrinkage compensating concrete may be used without any restraint element, while still largely avoiding cracking. Using the concrete of the invention, tensile stresses created by shrinkage remain smaller than the tensile strength at any given time, in the absence of restraint, thereby preventing cracking. Two examples are provided below: a slab on grade (Example 1) and a self-leveling composition (Example 2).

Example 1

Restraint-Free Shrinkage Compensating Concrete

A new shrinkage compensating concrete may be used with no internal or external restraining elements, and will still resist shrinkage cracking as well as expansive concrete structures using restraining elements, such as steel bars or steel or non-metal fibers. This unrestrained shrinkage compensating concrete may be made in various ways. One example is made with the mix proportions in Table 1.

TABLE 1

| MATERIAL | AMOUNT | SOURCE | BATCH WT (LB) | ABS. VOL. $FT^3$ | SPEC. GRAV |
|---|---|---|---|---|---|
| Cement Type II/V | | ASTM C150 | 382 | 1.94 | 3.15 |
| Cement Type K | | CTS Komponent ® | 123 | 0..63 | 3.15 |
| Water | 33.3 gallons | | 277.4 | 4.45 | 1.00 |
| No. 3 Aggregate | 35% | Vuln. Bg Rk Crk SV | 1141 | 6.9 | 2.65 |
| No. 4 Aggregate | 26% | Vuln. Bg Rk Crk SV | 843 | 5.12 | 2.65 |
| Concrete Sand | 39% | Vuln. Bg Rk Crk SV | 1272 | 7.69 | 2.65 |
| C494 Type A WR | 4.0 oz/cwt C + P | Eucon NW | 20.2 oz/cubic yard | | |
| Material Totals | | | 4043.2 | 27.00 | |
| Air Content | 1% | | | 0.27 | |
| Plastic Unit Weight | 149.7 pcf | | | | |

Komponent® is an expansive material per ASTM Type K available from CTS Cement Mfg. Co. Cypress, Calif.

Table 2 shows the aggregate gradation used for this concrete.

TABLE 2

| | Size (mm) | | | | | | | | | | | | |
|---|---|---|---|---|---|---|---|---|---|---|---|---|---|
| | 37.5 | 25 | 19 | 12.5 | 9.5 | 4.75 No. 4 | 2.36 No. 8 | 1.18 No. 16 | 0.6 No. 30 | 0.3 No. 50 | 0.15 No. 100 | 0.075 No. 200 | FM |
| No. 3 Agg. | 100 | 95 | 69 | 42 | 16 | 4 | 0 | 0 | 0 | 0 | 0 | 0 | 7.11 |
| No. 4 Agg. | | | 100 | 100 | 91 | 16 | 3 | 0 | 0 | 0 | 0 | 0 | 5.90 |
| Concrete Sand | | | | | 100 | 98 | 83 | 67 | 45 | 21 | 8 | 2 | 2.78 |

TABLE 2-continued

| | Size (mm) | | | | | | | | | | | | |
|---|---|---|---|---|---|---|---|---|---|---|---|---|---|
| | 37.5 | 25 | 19 | 12.5 | 9.5 | 4.75 No. 4 | 2.36 No. 8 | 1.18 No. 16 | 0.6 No. 30 | 0.3 No. 50 | 0.15 No. 100 | 0.075 No. 200 | FM |
| Comb. Grad. | 100 | 98 | 89 | 80 | 68 | 44 | 33 | 26 | 18 | 8 | 3 | 1 | 5.11 |

The concrete in Example 1 was cast as a 6 inch slab on ground. Two layers of thick plastic were placed between the sub-base and the concrete slab. The expansion in the concrete as measured by C 878 bars was 0.04% in seven days. Concrete strength by ASTM C 39 was 2,314 psi at 7 days and 2,632 psi at 28 days. The mortar expansion as measured by ASTM C 806 was 0.1830% at 7 days for 24 wt % Komponent®. This expansion also places the cement of the outside the bounds defined by ASTM C 845. An inspection of the slab after five months found the slab to be crack free.

Example 2

Self-Leveling Floors

The concept described above can be extended to construction materials used as underlayment, self-leveling floors, and/or toppings. A self-leveling hydraulic cement-based topping mix usually exhibits high flow characteristics. It is typically used to create a flat and smooth surface with a compressive strength similar to or higher than that of traditional concrete prior to installing interior floor coverings. When it is poured, it has a viscosity similar to pancake batter. The low viscosity is obtained through the addition of polymers and/or large amounts of water. Since all of this water is not needed in the hydration of the cement, its evaporation can lead to drying shrinkage and cracking.

The addition of controlled amounts of expansive additives will adjust the expansion of the floor topping to minimize drying shrinkage and result in a near-zero dimensional change during drying. As a result, the self-leveling floor is essentially crack-free.

FIG. 1 shows the typical shrinkage as a function of time for a self-leveling hydraulic cement composition (TRU®, available from CTS Cement Manufacturing Co, Cypress Calif.) with and without an expansive additive (Komponent® ASTM Type K expansive cement, available from CTS Cement Manufacturing Co, Cypress Calif.). The measurement was made using a shrinkage cone apparatus fitted with a laser beam measurement device (Schleibinger Testing Systems). The advantage of the shrinkage cone technique, compared to the traditional ASTM C 878 bar is that the shrinkage is tested in the absence of metallic restraint. After 3 days, the shrinkage of the self-leveling composition was 0.005 in. without expansive additive, and 0.0027 in. (or about half that of the unmodified composition) with 10% of the expansive additive Komponent®. With 12% of the additive, the material showed an expansion of 0.002 in. and 0.004 in. with a 14% addition of Komponent ASTM Type K expansive cement.

Example 3

Restraint-Free, Shrinkage-Compensated Mortar

Mortar can also be modified to exhibit crack-free expansion compensated to zero-shrinkage. Length change in such materials is usually tested using ASTM C157 and ASTM C596 standards. Is this example, the specimens were removed from the mold 30 minutes after final set and a first reading was taken. They were then stored in lime-saturated water for 7 days. Length change measurements were taken every 30 minutes for 3 hours after the initial reading, then daily for the seven days. After 7 days, specimens were taken out of lime water, and stored in air (73±3° F., 50±4% humidity).

FIG. 2 shows that the early expansion caused by additives is able to compensate the subsequent shrinkage overtime-in the absence of restraint, which is a departure from the prior art. FIG. 2 shows shrinkage for the base material (CSA cement) reduced to near zero with the use of expansive additives (such as, but not limited to Calcium Sulfate and hydrated lime).

| Mix Proportions | | | |
|---|---|---|---|
| Mix | 1 | 2 | 3 |
| CSA Cement | 33.33% | 31.83% | 31.50% |
| ASTM C778 Silica Sand | 66.67% | 66.67% | 66.67% |
| Hydrated Lime | 0.00% | 0.20% | 0.20% |
| Calcium Sulfate | 0.00% | 1.30% | 1.63% |
| Water to Cement Ratio | 0.47 | 0.47 | 0.47 |

As described, a concrete may include an expansive cement such that the expansive forces developed during hydration compensate concrete shrinkage, obviating the need for internal or external metallic restraint.

A concrete may include an expansive cement such that the expansive forces developed during its hydration compensate concrete shrinkage, obviating the need for restraint and resulting in a substantially crack-free slab.

A concrete may include a cement developing internal expansive forces at all times smaller than its tensile strength, such that the internal expansion compensates concrete shrinkage, resulting in a shrinkage-compensating slab without the need for internal reinforcement. The expansive cement may be a Type K cement. The expansive cement may include calcium sulfoaluminate or any other oxide or sulfate expanding upon hydration.

A shrinkage-compensating concrete or mortar may be provided substantially without internal restraint in which the tensile strength of the concrete or mortar exceeds the expansive forces in the concrete A self-leveling hydraulic cement-based topping composition may be provided such that the internal expansion compensates shrinkage, resulting in a shrinkage-compensating topping without the need for internal reinforcement.

A self-leveling hydraulic cement based topping composition may include an expansive agent causing internal expansion to compensate for shrinkage while remaining below the tensile strength, resulting in an essentially crack-free self-leveling floor. The expansive agent may be a calcium sulfoaluminate such as Komponent® ASTM Type K cement.

A method is provided for placing essentially crack-free slabs of concrete in which an expansive cement is mixed with hydraulic cement. The expansion compensates for shrinkage, so that the need for internal or external reinforcement is obviated.

A method is provided for placing essentially crack-free self-leveling floors wherein an expansive compound is mixed with a self-leveling topping composition. The expansion compensates for shrinkage so that the need for internal or external reinforcement is obviated.

Thus, a novel concrete and method has been shown and described. Various changes may of course be made without departing from the spirit and scope of the invention. The invention, therefore, should not be limited except by the following claims and their equivalents.

The invention claimed is:

1. A shrinkage-compensated crack-free concrete structure, comprising:
    a hydraulic cement, an expansive additive, aggregate and water; and
    with the structure having no internal metal fibers or bars and no external restraint, and the structure having sufficient self-restraint wherein the structure remains free of cracks via expansive forces developed during hydration compensating for concrete shrinkage and with the length of the structure over time never shrinking below its original length.

2. The concrete structure of claim 1 having internal expansive forces which at all times are lower than its tensile strength, such that the internal expansion compensates concrete shrinkage, resulting in a shrinkage-compensation without the need for reinforcement.

3. A shrinkage-compensated crack-free concrete structure, comprising:
    an expansive hydraulic cement, aggregate and water;
    with the structure free of cracks and having no metallic internal restraint.

4. The concrete structure of claim 3 wherein the structure comprises a slab.

5. The concrete structure of claim 3 wherein the structure has no internal restraint and no external restraint.

6. The concrete structure of claim 3 wherein the concrete meets ASTM C-845 without using internal metallic restraint.

7. A shrinkage-compensated crack-free concrete structure, comprising:
    a hydraulic cement, an expansive additive, aggregate and water; and
    with the structure having no internal metal fibers or bars and no external restraint, and the structure having sufficient self-restraint wherein the structure remains free of cracks via expansive forces developed during hydration compensating for concrete shrinkage and with the length of the structure over time never shrinking below its original length; and
    wherein the concrete structure meets ASTM C-845.

* * * * *